United States Patent [19]
Matsumoto

[11] Patent Number: 6,105,974
[45] Date of Patent: Aug. 22, 2000

[54] CHUCK

[75] Inventor: Masakazu Matsumoto, Osaka, Japan

[73] Assignee: Nikken Kosakusho Works Ltd., Osaka-fu, Japan

[21] Appl. No.: 09/028,508

[22] Filed: Feb. 23, 1998

[30]    Foreign Application Priority Data

Feb. 24, 1997  [JP]  Japan ..................................... 9-039385
May 30, 1997  [JP]  Japan ..................................... 9-141342

[51] Int. Cl.[7] ...................................................... B23B 5/22
[52] U.S. Cl. .......................... 279/9.1; 279/103; 279/903; 409/234
[58] Field of Search ................. 279/9.1, 48, 56, 279/103, 157, 903; 409/234

[56]                References Cited

U.S. PATENT DOCUMENTS

| | | | |
|---|---|---|---|
| 4,021,051 | 5/1977 | Toyomoto et al. ...................... | 279/103 |
| 4,630,980 | 12/1986 | Kubo ...................................... | 279/103 |
| 4,660,840 | 4/1987 | Mizoguchi ............................. | 279/103 |
| 4,721,423 | 1/1988 | Kubo ...................................... | 279/903 |

FOREIGN PATENT DOCUMENTS

| | | | | |
|---|---|---|---|---|
| 359024907A | 2/1984 | Japan | ..................................... | 279/903 |
| 361265237A | 11/1986 | Japan | ..................................... | 279/903 |
| 0287949 | 12/1987 | Japan | ..................................... | 279/903 |
| 402053503A | 2/1990 | Japan | ..................................... | 279/903 |
| 0076608 | 3/1990 | Japan | ..................................... | 279/903 |
| 0262904 | 10/1990 | Japan | ..................................... | 279/903 |

*Primary Examiner*—Daniel W. Howell
*Assistant Examiner*—Monica Smith
*Attorney, Agent, or Firm*—Ladas & Parry

[57]                  ABSTRACT

A chuck includes a holder body, a clamp sleeve, and a large number of needle rollers. The holder body has a shank portion, a flange formed at one end of the shank portion, and a chuck sleeve that extends from the flange in the direction away from the shank portion. The clamp sleeve is fitted onto the outer circumference of the chuck sleeve such that the clamp sleeve is rotatable and axially movable relative to the chuck sleeve. The needle rollers are disposed between the chuck sleeve and the clamp sleeve over the entire circumference. The clamp sleeve is rotated to cause the needle rollers to revolve spirally along the outer circumferential surface of the chuck sleeve while rotating about their own axes in order to decrease and restore the diameter of the chuck sleeve. In the chuck, a groove having a predetermined depth is formed in the end surface of the flange opposite the shank portion such that the groove surrounds the base end of the chuck sleeve through which the chuck sleeve is joined with the flange.

11 Claims, 9 Drawing Sheets

CHUCK

BACKGROUND OF THE INVENTION

1. Field of the Invention

The present invention relates to a chuck for chucking a cutting tool such as a drill, and more particularly to a chuck in which a clamp sleeve is fitted onto the outer circumference of a chuck sleeve of a holder body via needle rollers, and in which, through rotation of the clamp sleeve in a clamping direction, the diameter of the chuck sleeve is reduced in order to tightly chuck a desired tool.

2. Description of the Related Art

Figure 8:
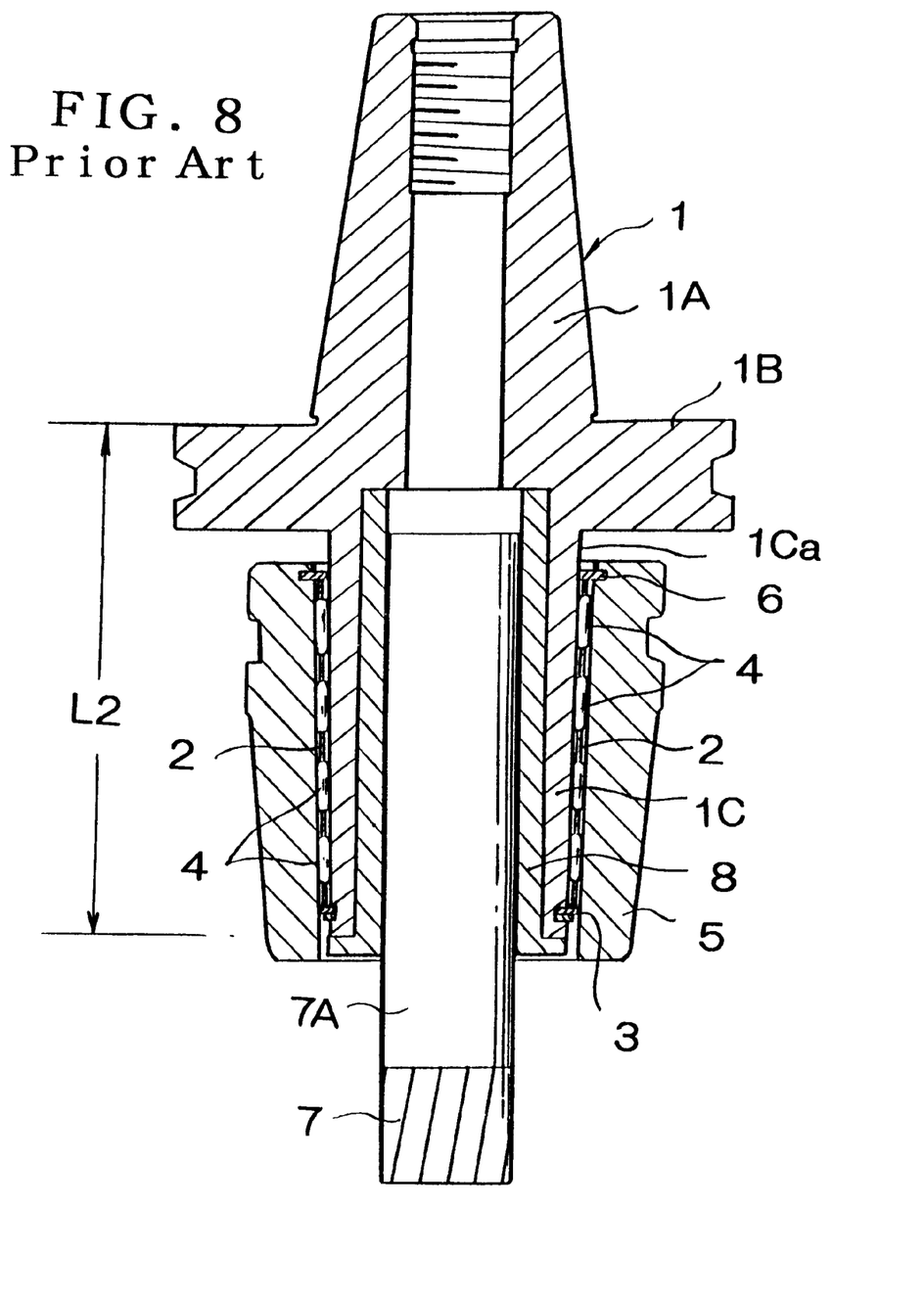
FIG. 8 is a cross-sectional view of a conventional chuck.

A conventional chuck will be described with reference to FIGS. 8 and 9. FIG. 8 is a cross-sectional view of a tool chuck, and FIG. 9 is an exploded perspective view of the tool chuck, showing the structural components thereof.

Figure 9:
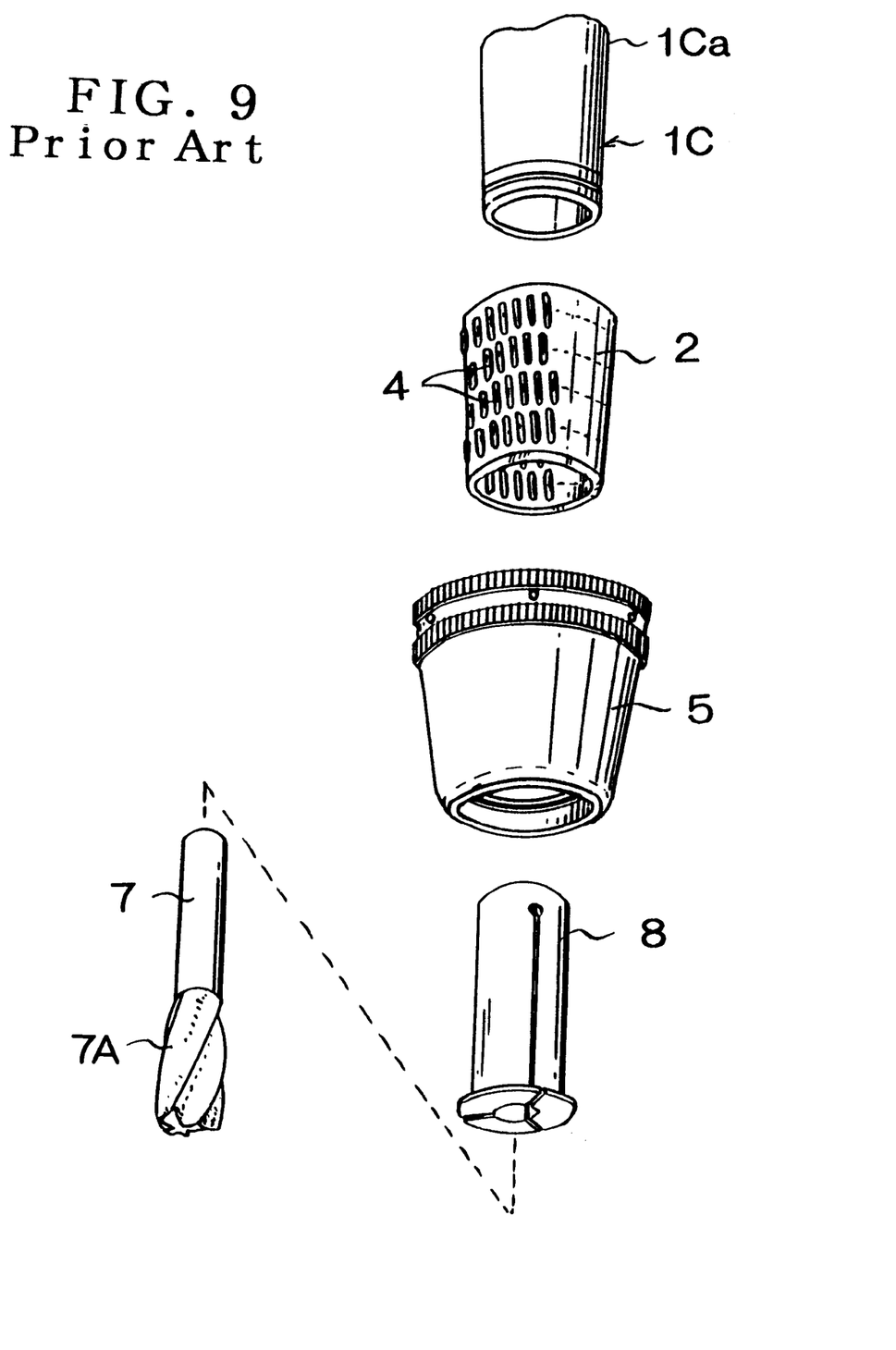
FIG. 9 is an exploded perspective view of the conventional chuck showing the structural components thereof.

As shown in FIGS. 8 and 9, the tool chuck has a holder body 1. The tool holder body 1 has a tapered shank portion 1A to be inserted into a spindle of an unillustrated machine tool, a gripping flange 1B formed at the larger-diameter end of the tapered shank portion 1A, and a chuck sleeve 1C that extends from the end surface of the flange 1B opposite the tapered shank portion 1A. The chuck sleeve 1C extends in the direction away from the tapered shank portion 1A such that the axis of the chuck sleeve 1C coincides with the axis of the tapered shank portion 1A. A tapered surface 1Ca is formed on the outer circumference of the chuck sleeve 1C such that the diameter of the surface 1Ca decreases toward the tip end thereof.

Numeral 2 denotes a roller retaining sleeve which is fitted onto the outer circumference of the chuck sleeve 1C with a clearance therebetween. The diameter of the roller retaining sleeve 2 decreases toward the tip end thereof at the same rate as that of the tapered surface 1Ca of the chuck sleeve 1C. The roller retaining sleeve 2 is held by a retainer ring 3 provided on the outer circumference of the tip end portion of the chuck sleeve 1C such that the roller retaining sleeve 2 is prevented from coming off the chuck sleeve 1C.

In the roller retaining sleeve 2, numerous needle rollers 4 are disposed to form a plurality of rows. The needle rollers are fitted into the roller retaining sleeve 2 in such a manner that the needle rollers incline in the circumferential direction at a predetermined angle with respect to the center axis of the roller retaining sleeve 2. Each of the needle rollers 4 has a diameter greater than the wall thickness of the roller retaining sleeve 2, so that the portion of each needle roller 4 projecting inward from the inner circumferential surface of the roller retaining sleeve 2 is in contact with the tapered surface 1Ca of the chuck sleeve 1C, while the portion of each needle roller 4 projecting outward from the outer circumferential surface of the roller retaining sleeve 2 is in contact with the inner circumferential surface of a clamp sleeve 5, which will be described below.

The clamp sleeve 5 is adapted to decrease the diameter of the chuck sleeve 1C to thereby tightly chuck a desired tool. The clamp sleeve 5 is fitted onto the outer circumference of the chuck sleeve 1C via the needle rollers 4 held by the roller retaining sleeve 2. The clamp sleeve 5 has a tapered inner circumferential surface whose diameter decreases from the end facing the flange 1B toward the tip end thereof. Further, a sealing/retaining ring 6 is attached to the inner circumference of the base end portion of the clamp sleeve 5 adjacent to the flange 1B. The sealing/retaining ring 6 is in contact with the outer circumferential surface of the chuck sleeve 1C so as to provide a sealing function. The sealing/retaining

2 ring 6 also abuts the end surface of the roller retaining sleeve 2 in order to prevent the clamp sleeve 5 from coming off the chuck sleeve 1C.

In the conventional chuck having the above-described structure, when a tool 7 is to be chucked, a spring collet 8 is fitted onto the shank 7A of the tool 7, and the shank 7A of the tool 7, together with the spring collet 8, is inserted into the cylindrical bore of the chuck sleeve 1C. When the clamp sleeve 5 is rotated clockwise, each needle roller 4 in contact with the tapered inner surface of the clamp sleeve 5 revolves spirally along the outer surface of the chuck sleeve 1C while rotating about its own axis. Thus, the roller retaining sleeve 2 moves toward the flange 1B, while rotating, in accordance with the revolution of the needle rollers 4, and at the same time the clamp sleeve 5 also moves toward the flange 1B. The movements of the roller retaining sleeve 2 and the clamp sleeve 5 toward the flange 1B reduce the clearance between the tapered inner surface of the clamp sleeve 5 and the tapered outer surface of the chuck sleeve 1C, so that the clamp sleeve 5 strongly presses the chuck sleeve 1C from the entire outer circumference thereof via the needle rollers 4 in order to reduce the diameter of the chuck sleeve 1C. As a result, the shank 7A of the tool 7 inserted into the cylindrical bore of the chuck sleeve 1C is clamped and held by the chuck sleeve 1C via the spring collet 8.

When the clamp sleeve 5 in a clamped state is rotated counterclockwise, the roller retaining sleeve 2 moves toward the tip end of the chuck sleeve 1C, and the clamp sleeve 5 also moves in the same direction. Therefore, the diameter of the chuck sleeve 1C is restored to its original size, so that the clamping force applied to the tool 7 is released. This enables the tool 7 to be removed from the chuck sleeve 1C or be replaced with a different tool.

In such a conventional chuck, the chuck sleeve 1C extends from the end surface of the flange 1B opposite the tapered shank portion 1A. Therefore, within an area 1Ca adjacent to the base portion of the chuck sleeve 1C continuous with the flange 1B, the rigidity against elastic deformation in the radial direction is considerably higher than that in the remaining area. Therefore, when the clamp sleeve 5 is rotated in the clamping direction so as to reduce the diameter of the chuck sleeve 1C, within the above-described area 1Ca the ratio of reduction in diameter is very small compared to that in the remaining area. This phenomenon will be described with reference to FIG. 2.

Figure 2A:
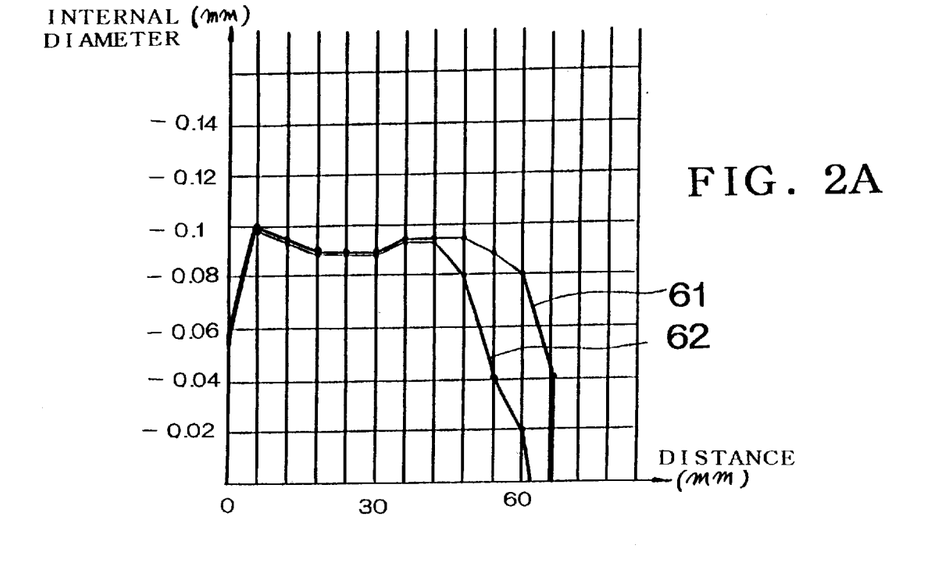
FIG. 2A is a graph showing variation in the reduced internal diameter of the tightened chuck sleeve.
Figure 2B:
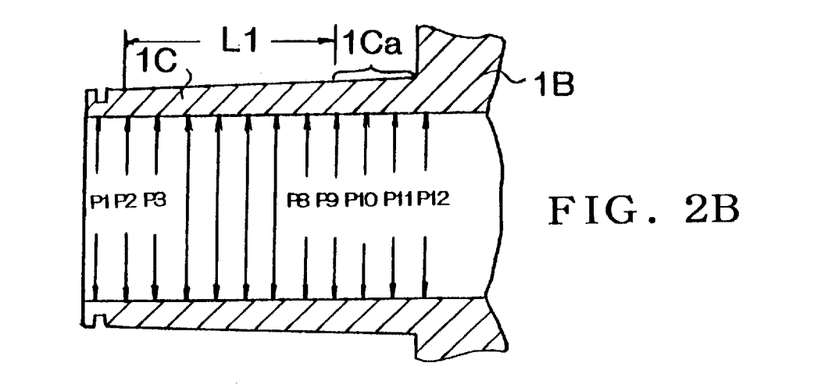
FIG. 2B is a cross-sectional view of the chuck sleeve of the conventional chuck.

FIG. 2A is a graph showing variation in the internal diameter of the conventional chuck sleeve 1C in a clamped state, and FIG. 2B shows a cross sectional view of the conventional chuck sleeve 1C.

When the conventional chuck sleeve 1C shown in FIG. 2B is clamped by the clamp sleeve 5 and the reduced internal diameter is measured at each of points P1 to P12 situated from the open end of the chuck sleeve 1C to the flange 1B, the reduction in internal diameter changes as shown by a curve 62 in FIG. 2A. As is apparent from the curve 62, the reduction in internal diameter is relatively large and constant in an area corresponding to the points P2 to P9, whereas in the area 1Ca corresponding to the points P10 to P12 the reduction in internal diameter becomes very small and the rate of the reduction increases towards the flange 1B.

The above-described phenomenon occurs because of elastic deformation of the clamp sleeve 5. That is, in the area 1Ca corresponding to the points P10 to P12, the rigidity against radial elastic deformation increases with decreasing distance from the flange 1B, and therefore the portion of the clamp sleeve 5 facing the area 1Ca deforms elastically to increase its diameter. As a result, the chucking force in the area 1Ca decreases, with the result that the shank 7a of the tool 7 cannot be held with a uniform chucking force over the entire length thereof. Moreover, the effective chucking length L1 over which the chuck sleeve 1C actually chucks the tool 7 decreases.

Especially, when heavy cutting is conducted through use of a tool that is chucked over such a short effective chucking length L1, there occurs an eccentric motion in which the tip end of the chuck sleeve 1C serves as a fulcrum. As a result, in the area 1Ca where the chuck force becomes low, friction is generated between the outer peripheral surface of the tool shank and the inner surface of the chuck sleeve 1C, resulting in damage to the outer peripheral surface of the tool shank and the inner surface of the chuck sleeve 1C.

When the clamp sleeve 5 is rotated in the clamping direction until the clamp sleeve 5 abuts the flange 1B of the holder body 1, the reduction in internal diameter within the area 1Ca becomes large to some degree. However, in this case, a large clamp force must be applied to the clamp sleeve 5. Further, within the area 1Ca the load acting on the needle rollers becomes excessively large, and in worst case, in addition to the surface of the needle rollers, the outer peripheral surface of the chuck sleeve 1C and the inner surface of the clamp sleeve 5 which are in contact with the needle rollers are damaged, resulting in a decrease in the force of chucking a tool.

Moreover, when the length of the chuck sleeve 1C is increased in order to increase the effective clamping length L1, a so-called tool length L2 of the holder body 1 increases, and therefore the size and weight of the chuck increase.

SUMMARY OF THE INVENTION

The present invention has been accomplished to solve the above-mentioned problems, and an object of the invention is to provide a chuck in which a chuck sleeve can be easily deformed in the direction of decreasing diameter over substantially the entire length of the chuck sleeve, and which can increase the effective chucking length with no accompanying increase in the length of the chuck sleeve.

To achieve the above object, the present invention provides a chuck which comprises a holder body having a shank portion to be inserted into a spindle of a machine tool, a gripping flange formed at one end of the shank portion, and a chuck sleeve that extends from the flange in the direction away from the shank portion in alignment with the axis of the shank portion, the chuck sleeve having a tapered outer circumferential surface whose diameter decreases from the base end adjacent to the flange toward the tip end of the chuck sleeve; a clamp sleeve fitted onto the outer circumference of the chuck sleeve such that the clamp sleeve is rotatable and axially movable relative to the chuck sleeve, the clamp sleeve having a tapered inner circumferential surface whose diameter decreases from the base end adjacent to the flange toward the tip end of the clamp sleeve; and needle rollers disposed between the outer circumferential surface of the chuck sleeve and the inner circumferential surface of the clamp sleeve over the entire circumference, the needle rollers inclining in the circumferential direction at a predetermined angle with respect to the center axes of the chuck sleeve and the clamp sleeve, and the clamp sleeve being rotated to cause the needle rollers to revolve spirally along the outer circumferential surface of the chuck sleeve while rotating about their own axes in order to decrease and restore the diameter of the chuck sleeve, wherein a groove having a predetermined depth is formed in the end surface of the flange opposite the shank portion such that the groove extends along the outer circumference of the base end of the chuck sleeve through which the chuck sleeve is joined with the flange.

In the chuck according to the present invention, a groove having a predetermined depth is formed in the end surface of the flange opposite the shank portion such that the groove surrounds the base end of the chuck sleeve through which the chuck sleeve is joined with the flange. Therefore, the overall length of the chuck sleeve can be increased with no accompanying increase in the overall length of the holder body. Thus, the radially inward elastic deformation of the chuck sleeve in the base end area adjacent to the flange can be made substantially equal to that in the remaining area.

The above structure increases the effective chucking length without an increase in the length of the chuck sleeve. Also, since the chuck sleeve can be deformed easily in the direction of decreasing diameter, the clamp sleeve can be tightened easily with relatively small tightening force until the clamp sleeve abuts the flange of the holder body. Further, since a larger chucking force can be applied to the tool shank in the base end area of the chuck sleeve, there is prevented eccentric motion of a tool in which the tip end of the chuck sleeve serves as a fulcrum, even when a heavy cutting operation is performed.

Moreover, since the above-described structure increases the effective chucking length of the chuck sleeve and allows the clamp sleeve to be tightened until the clamp sleeve abuts the flange of the holder body, the chuck sleeve can be made shorter than the chuck sleeve of a conventional chuck, and the tool length of the holder body can be decreased accordingly. Therefore, the weight and size of the chuck can be decreased.

In the chuck of the present invention, a plurality of grooves are preferably formed in the inner wall surface of the chuck sleeve at predetermined intervals in the circumferential direction such that the grooves extend over the entire length of the inner wall surface and parallel to the center axis of the chuck sleeve.

In this case, the clamp sleeve can more easily undergo elastic deformation in the direction of decreasing diameter. Therefore, the effective chucking length of the chuck sleeve can be increased with no accompanying increase in the length thereof, and the wall thickness of the clamp sleeve can be decreased. Further, when a tool inserted into the chuck sleeve is tightened, oil adhering to the tool can flow into the grooves formed in the inner wall surface of the chuck sleeve.

In the chuck of the present invention, in place of the plurality of grooves, a plurality of holes are preferably formed in the chuck sleeve at predetermined intervals in the circumferential direction such that the holes extend over substantially the entire length of the sleeve and parallel to the center axis thereof. In this case, a plurality of slits are preferably formed in the chuck sleeve at circumferential locations corresponding to those of the holes such that the slits extend from the holes and open at the inner wall surface.

In this case, the clamp sleeve can more easily undergo elastic deformation in the direction of decreasing diameter. In addition, the decrease in internal diameter due to elastic deformation can be made uniform over substantially the entire length of the chuck sleeve. Moreover, the wall thickness of the clamp sleeve can be decreased.

In the chuck of the present invention, an annular plate made of metal having elasticity is preferably provided at the tip end portion of the chuck sleeve in such a manner that the inner circumferential portion of the plate is fixed to the outer circumferential surface of the tip end portion of the chuck sleeve, while the outer circumferential edge of the plate is pressed against the inner circumferential surface of the clamp sleeve.

In this case, strong chucking force can be applied to the shank of a tool within an area extending from the base end to the tip end of the chuck sleeve, so that the tool can be chucked more reliably.

In the chuck of the present invention, the groove having a predetermined depth is preferably formed along the entire outer circumference of the chuck sleeve to have a ring-like shape.

In this case, elastic deformation of the chuck sleeve in the direction of decreasing diameter becomes easier. Therefore, a strong chucking force can be generated even when the tool length of the holder body is decreased.

In the chuck of the present invention, an elastically deformable O-ring is preferably fitted into the groove formed in the flange; and a retainer ring made of an elastic metal is preferably provided at the flange-side end portion of the clamp sleeve in such a manner that the outer circumferential edge of the retainer ring is fixed to the inner circumferential portion of the flange-side end portion of the clamp sleeve, while the flange-side end of a roller retaining sleeve that retains the needle rollers is supported by the inner circumferential portion of the retainer ring. When the O-ring is compressed through rotation of the clamp sleeve, the O-ring is pressed against the bottom of the groove and the retainer ring.

In this case, since vibrations, such as chatter, generated in a tool during cutting operation can be absorbed by the O-ring, the cutting operation can be performed accurately. Further, dust and cutting fluid used for cutting operation are reliably prevented from entering the needle-roller section through the clearance between the flange and the clamp sleeve. Further, dust and cutting fluid used for cutting operation are reliably prevented from entering the flange groove.

In the case where an O-ring is used, an annular metal spacer fitted onto the chuck sleeve is preferably interposed between the O-ring and the retainer ring. When the O-ring is compressed through rotation of the clamp sleeve, the O-ring is pressed against the bottom of the groove and is also pressed against the retainer ring via the spacer.

In this case, since an annular metal spacer is fitted onto the chuck sleeve to be interposed between the O-ring and the retainer ring, even when the retainer ring has a C-like shape the O-ring is prevented from partially entering the opening portion of the retainer ring, which entrance would otherwise occur due to deformation of the O-ring. Therefore, absorption of vibration and prevention of dust and cutting fluid from entering into the needle-roller portion are realized in a reliable manner. Further, the spacer is useful for preventing fatigue of the O-ring.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 2A through 2C are explanatory diagrams showing a chuck according to the embodiment of the present invention and a conventional chuck, and also showing variation in the reduced internal diameter of the tightened chuck sleeve of each of the chucks, wherein

FIGS. 3A and 3B show a second embodiment of the present invention, wherein

FIGS. 4A and 4B show a third embodiment of the present invention, wherein

FIGS. 5A and 5B show a fourth embodiment of the present invention, wherein

FIGS. 6A and 6B show a fifth embodiment of the present invention, wherein

DETAILED DESCRIPTION OF PREFERRED EMBODIMENTS

Embodiments of the present invention will be described with reference to the accompanying drawings.

Figure 1:
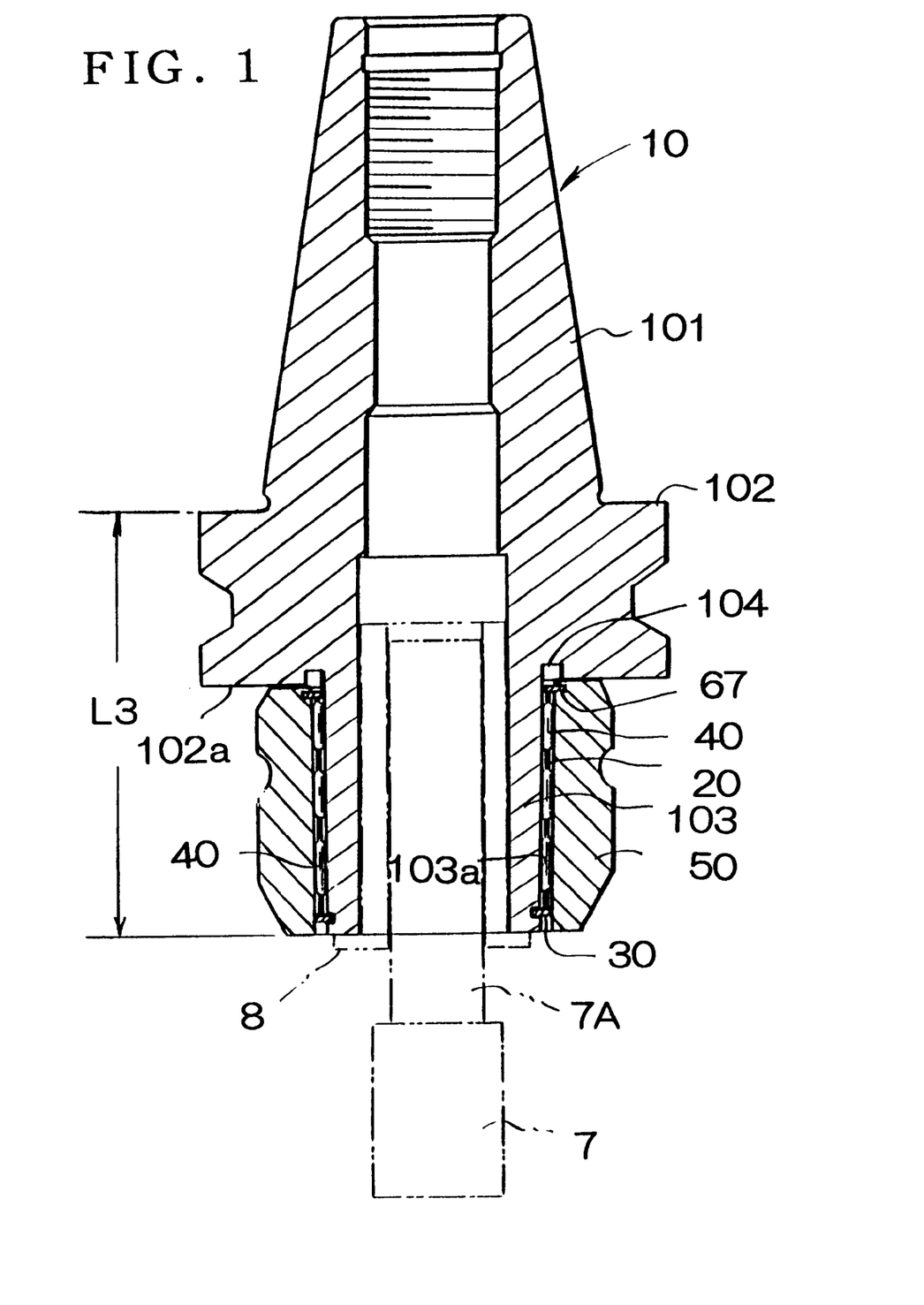
FIG. 1 is a cross-sectional view of a chuck according to a first embodiment of the present invention.

FIG. 1 shows a cross-sectional view of a tool chuck according to a first embodiment of the present invention.

As shown in FIG. 1, the tool chuck has a holder body 10, which has a tapered shank portion 101 to be inserted into a spindle of an unillustrated machine tool, a gripping flange 102 formed at the larger-diameter end of the tapered shank portion 101, and a chuck sleeve 103 that extends from the end surface 102a of the flange 102 opposite the tapered shank portion 101. The chuck sleeve 103 extends in the direction away from the tapered shank portion 101 such that the axis of the chuck sleeve 103 coincides with the axis of the tapered shank portion 101. The chuck sleeve 103 has a tapered outer circumferential surface 103a whose diameter decreases from the base end adjacent to the flange 102 toward the tip end.

In the end surface 102a of the flange 102 opposite the tapered shank portion 101, a groove 104 having a predetermined depth (approximately 3 to 5 mm) is formed, at the base portion of the chuck sleeve 103 through which the chuck sleeve 103 is joined with the flange 102, such that the groove 104 extends along the outer circumference of the chuck sleeve 103 to form a ring-like shape. The ring-shaped groove 104 allows the chuck sleeve 103 to be extended toward the flange 102 side without changing the tool length L3 of the holder body 10. By virtue of the above-described structure, the radially inward elastic deformation of the chuck sleeve 103 in a base end area adjacent to the flange 102 is made substantially equal to that in the remaining area. This is the characteristic feature of the present embodiment.

Numeral 20 denotes a roller retaining sleeve fitted onto the outer circumference of the chuck sleeve 103 with a clearance therebetween. The diameter of the roller retaining sleeve 20 decreases toward the tip end thereof at the same rate as that of the tapered surface 103a of the chuck sleeve 103. The roller retaining sleeve 20 is held by a retainer ring 30 provided on the outer circumference of the tip end portion of the chuck sleeve 103 such that the roller retaining sleeve 20 is prevented from coming off the chuck sleeve 103.

In the roller retaining sleeve 20, numerous needle rollers 40 are arranged in the circumferential direction to form a plurality of rows in the longitudinal direction. In the present embodiment, the number of rows is three, which is one less than the number of rows of needle rollers in the case shown in FIG. 9. The needle rollers 40 are fitted into the roller retaining sleeve 20 in such a manner that the needle rollers 40 incline in the circumferential direction at a predetermined angle with respect to the center axis of the roller retaining sleeve 20. Each of the needle rollers 40 has a diameter greater than the wall thickness of the roller retaining sleeve 20, so that the portion of each needle roller 40 projecting inward from the inner circumferential surface of the roller retaining sleeve 20 is in contact with the tapered surface 103a of the chuck sleeve 103, while the portion of each needle roller 40 projecting outward from the outer circumferential surface of the roller retaining sleeve 20 is in contact with the inner circumferential surface of a clamp sleeve 50, which will be described below.

The clamp sleeve 50 is adapted to decrease the diameter of the chuck sleeve 103 to thereby tightly chuck a desired tool. The clamp sleeve 50 is fitted onto the outer circumference of the chuck sleeve 103 via the needle rollers 40 held by the roller retaining sleeve 20. The clamp sleeve 50 has a tapered inner circumferential surface whose diameter decreases from the end facing the flange 102 toward the tip end thereof. Further, a sealing/retaining ring 67 is attached to the inner circumference of the base end portion of the clamp sleeve 50 adjacent to the flange 102. The sealing/retaining ring 67 is in contact with the outer circumferential surface of the chuck sleeve 103 so as to provide a sealing function. The sealing/retaining ring 67 also abuts the end surface of the roller retaining sleeve 20 in order to prevent the clamp sleeve 50 from coming off the chuck sleeve 103.

In the chuck of the first embodiment having the above-described structure, when a tool 7 is to be chucked, a spring collet 8 is fitted onto the shank 7A of the tool 7, and the shank 7A of the tool 7, together with the spring collet 8, is inserted into the cylindrical bore of the chuck sleeve 103. When the clamp sleeve 50 is rotated clockwise, each needle roller 40 in contact with the tapered inner surface revolves spirally along the outer surface of the chuck sleeve 103 while rotating about its own axis. Thus, the roller retaining sleeve 20 moves toward the flange 102, while rotating, in accordance with the revolution of the needle rollers 40, and at the same time the clamp sleeve 50 also moves toward the flange 102. The movements of the roller retaining sleeve 20 and the clamp sleeve 50 toward the flange 102 reduce the clearance between the tapered inner surface of the clamp sleeve 50 and the tapered outer surface of the chuck sleeve 103, so that the clamp sleeve 50 strongly presses the chuck sleeve 103 from the entire outer circumference thereof via the needle rollers 40 in order to reduce the diameter of the chuck sleeve 103. As a result, the shank 7A of the tool 7 inserted into the cylindrical bore of the chuck sleeve 103 is clamped and held by the chuck sleeve 103 via the spring collet 8.

When the clamp sleeve 50 in a clamped state is rotated counterclockwise, the roller retaining sleeve 20 moves toward the tip end of the chuck sleeve 103, and the clamp sleeve 50 also moves in the same direction. Therefore, the diameter of the chuck sleeve 103 is restored to its original size, so that the clamping force applied to the tool 7 is released. This enables the tool 7 to be removed from the chuck sleeve 103 or be replaced with a different tool.

Figure 2C:
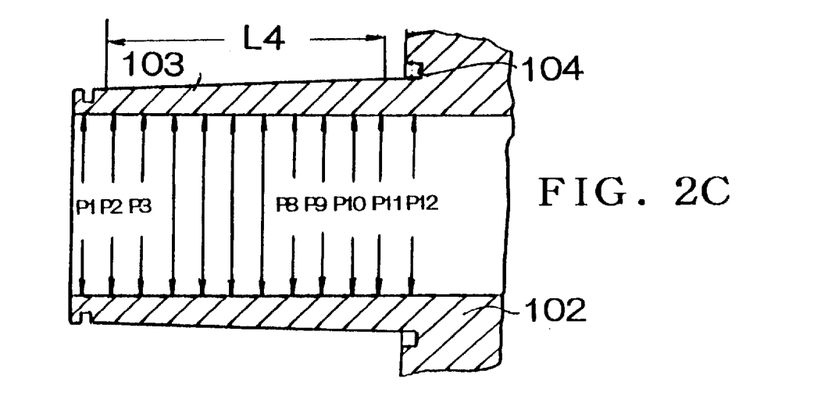
FIG. 2C is a cross-sectional view of the chuck sleeve of the chuck according to the embodiment of the present invention.

Next, descriptions are given of the chuck sleeve of the chuck according to the first embodiment and of variation in the internal diameter of the chuck sleeve when clamped with reference to FIGS. 2A and 2C. FIG. 2A is a graph showing variation in the internal diameter of the chuck sleeve in a clamped state, and FIG. 2C shows a cross sectional view of the chuck sleeve 103 according to the first embodiment.

As shown in FIG. 2C, the ring-shaped grove 104 allows the chuck sleeve 103 to be extended toward the flange 102 side without accompanying increase in the tool length L4 of the holder body 10. Therefore, when the chuck sleeve 103 was clamped by the clamp sleeve 50 and the reduced internal diameter was measured at each of points P1 to P12 situated from the open end of the chuck sleeve 103 to the flange 102, the reduction in internal diameter changed as shown by a curve 61 in FIG. 2A.

As is apparent from the curve 61, the reduction in internal diameter is relatively large and constant in an area corresponding to the points P2 to P11. As shown in FIG. 2C, the effective chucking area of the chuck sleeve 103 in which strong chucking force can be effectively applied to the shank 7A of the tool 7 and which has a length L4 is extended from the base end portion of the chuck sleeve 103 toward a point in the vicinity of the open tip end thereof, so that the effective chucking length L4 can be made larger than the effective chucking length L1 of the conventional chuck sleeve 1C.

In the above-described first embodiment of the present invention, the groove 104 having a predetermined depth is formed in the end surface of the flange 102 opposite the taper shank portion such that the groove 104 extends along the outer circumference of the chuck sleeve 103 in order to form a ring shaped groove. Therefore, the overall length of the chuck sleeve 103 can be increased with no accompanying increase in the tool length L4 of the holder body 10. Thus, the radially inward elastic deformation of the chuck sleeve 103 in the base end area adjacent to the flange 102 can be made substantially equal to that in the remaining area.

The above structure increases the length L3 of the effective chucking area of the chuck sleeve 103 in which large chucking force can be effectively applied to the shank 7a of the tool 7 can be increases such that the effective chucking area extends from the base end portion of the chuck sleeve 103 to a point in the vicinity of the open tip end thereof. Also, even in the based end portion of the chuck sleeve 103 through which the chuck sleeve 103 is joined with the flange 102, the chuck sleeve 103 can be deformed easily in the direction of decreasing diameter. Therefore, the clamp sleeve 50 can be tightened easily with relatively small tightening force until the clamp sleeve 50 abuts the flange 102 of the holder body 10, so that the chuck force applied to the tool shank in the base end portion can be increased sufficiently.

Further, since a larger chucking force can be applied to the tool shank in the base end area of the chuck sleeve 102, there is prevented eccentric motion of a tool in which the tip end of the chuck sleeve 103 serves as a fulcrum, even when a heavy cutting operation is performed. Therefore, there can be solved the problem of the conventional chuck that the outer peripheral surface of the tool shank and the inner surface of the chuck sleeve 103 rub each other, so that the outer peripheral surface of the tool shank and the inner surface of the chuck sleeve 103 are damaged.

Moreover, since the above-described structure increases the effective chucking length L4 of the chuck sleeve 103 and allows the clamp sleeve 50 to be tightened until the clamp sleeve 50 abuts the flange 102 of the holder body 10, the chuck sleeve 103 can be made shorter than the chuck sleeve of a conventional chuck, and the tool length L3 of the holder body 10 can be decreased accordingly. Therefore, the weight and size of the chuck can be decreased.

In the above-described embodiment, the groove 104 having a predetermined depth (about 3 to 5 mm) is formed in the end surface of the flange 102 opposite the taper shank portion such that the groove 104 extends along the outer circumference of the chuck sleeve 103 in order to form a ring shaped groove. However, the shape of the groove 104 is not limited to the continuous ring-like shape, but may be a uncontinuous groove that extends along part of the outer circumference of the chuck sleeve 103. Even in this case, the same effect is expected to be achieved.

Figure 3A:
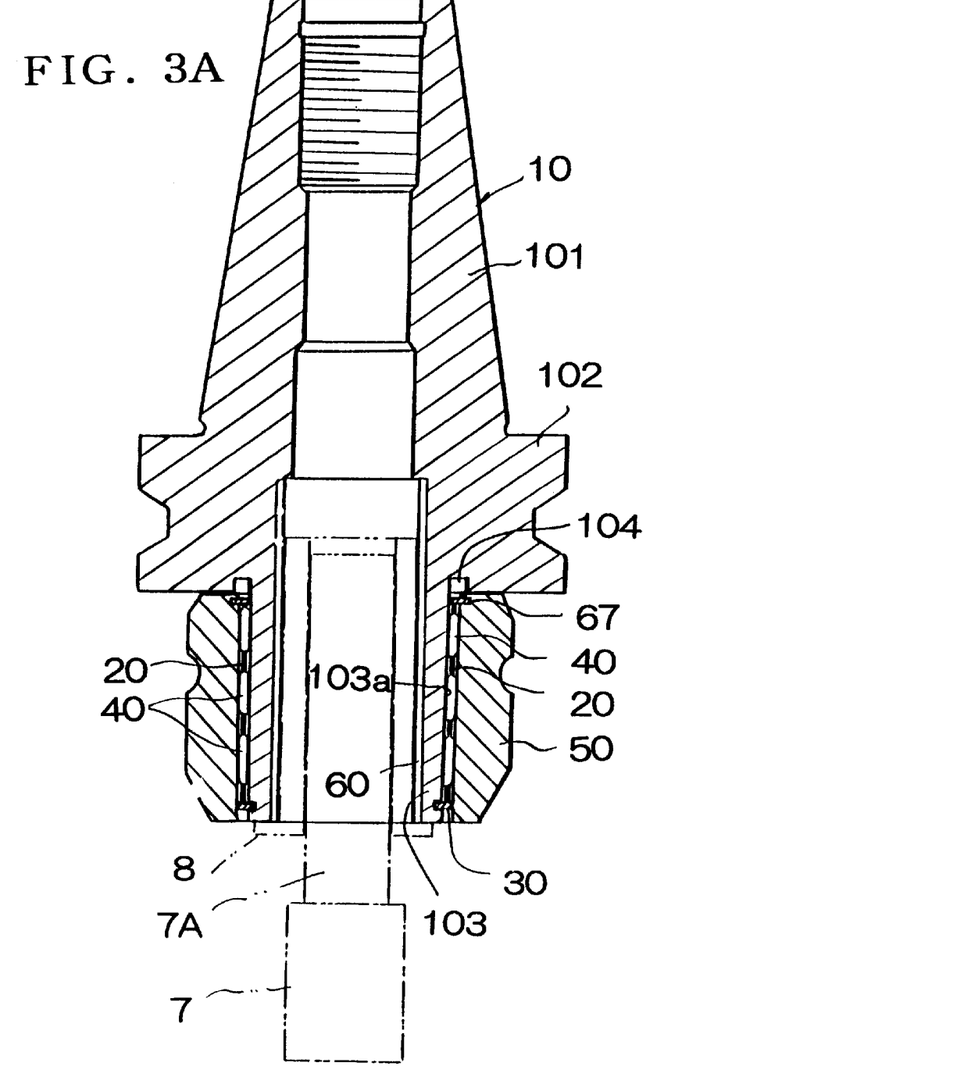
FIG. 3A is a cross-sectional view of a chuck.
Figure 3B:
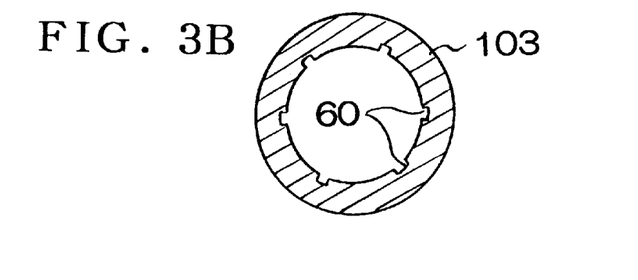
FIG. 3B is a transversal cross section of the chuck sleeve.

Next, a second embodiment of the present invention will be described with reference to FIGS. 3A and 3B. In FIGS. 3A and 3B, the structural components identical to those shown in FIG. 1 are denoted by the same reference numerals, and descriptions therefor will be omitted. The portion different from the structure shown in FIG. 1 will be mainly described.

In the second embodiment, in addition to a ring-shaped groove 104 that is formed in the flange 102 in order to increase the effective length of the chuck sleeve 103, a plurality of grooves 60 are formed in the inner wall surface of the chuck sleeve 103 at predetermined intervals in the circumferential direction such that the grooves 60 extend over the entire length of the inner wall surface and parallel to the center axis of the chuck sleeve 103.

In the chuck according to the second embodiment, since the plurality of grooves 60 are formed in the inner wall surface of the chuck sleeve 103, the chuck sleeve 103 can more easily undergo elastic deformation in the direction of decreasing diameter. Thus, the reduction in the internal diameter increases further in the area corresponding to the points P2 to P11 shown in FIG. 2C and the reduction in that area can be made more uniform compared to the case of the conventional chuck shown by the curve 61 in FIG. 2A.

Accordingly, over substantially the entire length of the chuck sleeve 103, the chuck sleeve 103 can be elastically deformed in the direction of decreasing the diameter with relatively small tightening force. Further, the effective chucking length of the chuck sleeve 103 can be increased with no accompanying increase in the length thereof, and the wall thickness of the clamp sleeve 50 can be decreased. Further, when a tool inserted into the chuck sleeve 103 is tightened, oil adhering to the tool can flow into the grooves 60 formed in the inner wall surface of the chuck sleeve 103.

Figure 4A:
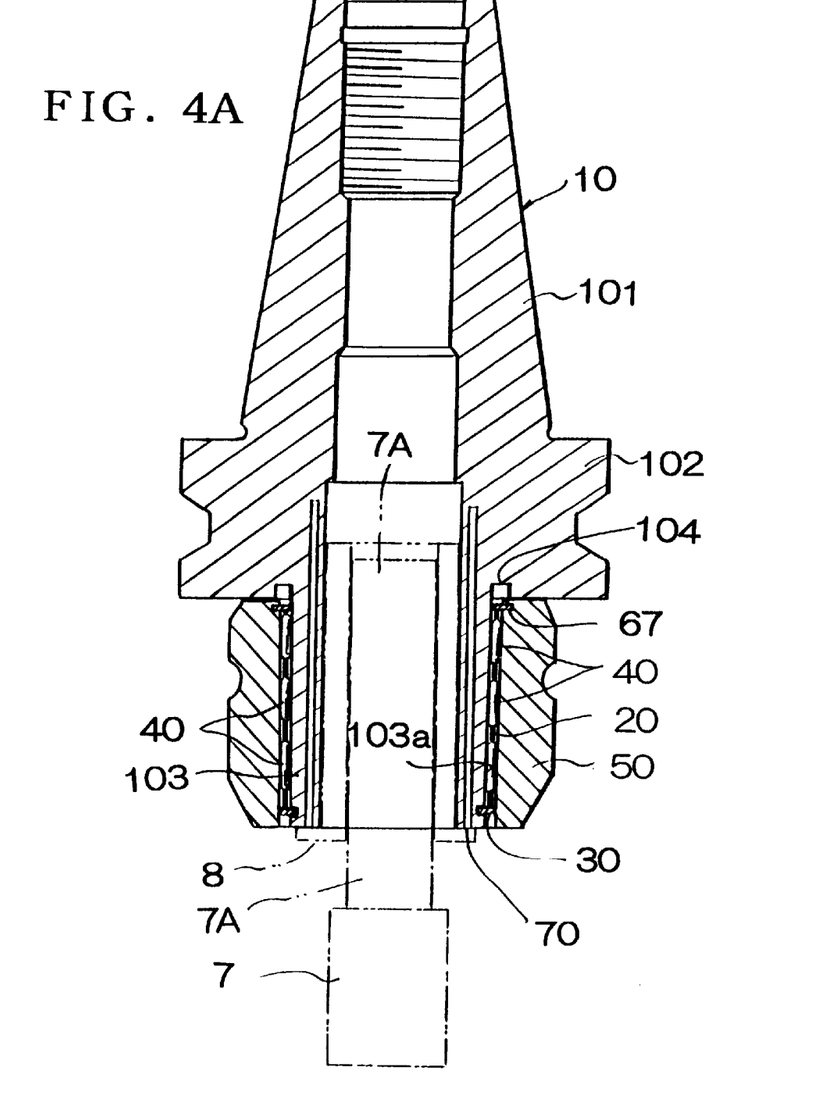
FIG. 4A is a cross-sectional view of a chuck.
Figure 4B:
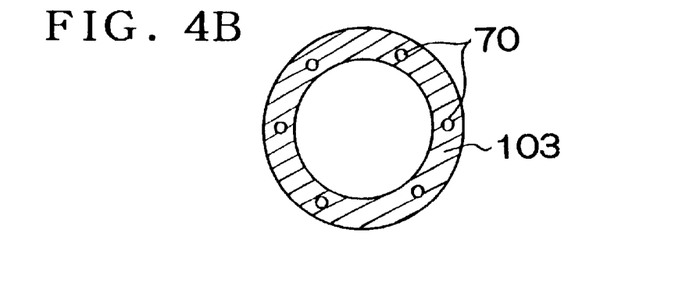
FIG. 4B is a transversal cross section of the chuck sleeve.

Next, a third embodiment of the present invention will be described with reference to FIGS. 4A and 4B. In FIGS. 4A and 4B, the structural components identical to those shown in FIG. 1 are denoted by the same reference numerals, and descriptions therefor will be omitted. The portion different from the structure shown in FIG. 1 will be mainly described.

In the third embodiment, in addition to a ring-shaped groove 104 that is formed in the flange 102 in order to increase the effective length of the chuck sleeve 103, a plurality of holes 70 are formed in the chuck sleeve 103 at predetermined intervals in the circumferential direction such that the holes 70 extend over substantially the entire length of the chuck sleeve 103 and parallel to the center axis thereof.

In the chuck according to the third embodiment, since the plurality of holes 70 are formed in the chuck sleeve 103, the chuck sleeve 103 can more easily undergo elastic deformation in the direction of decreasing diameter. Thus, the reduction in the internal diameter increases further in the area corresponding to the points P2 to P11 shown in FIG. 2C and the reduction in that area can be made more uniform compared to the case of the conventional chuck shown by the curve 61 in FIG. 2A.

Accordingly, over substantially the entire length of the chuck sleeve, the chuck sleeve 103 can be elastically deformed in the direction of decreasing the diameter with relatively small tightening force. Further, the effective chucking length of the chuck sleeve 103 can be increased with no accompanying increase in the length thereof, and the wall thickness of the clamp sleeve 50 can be decreased.

Figure 5A:
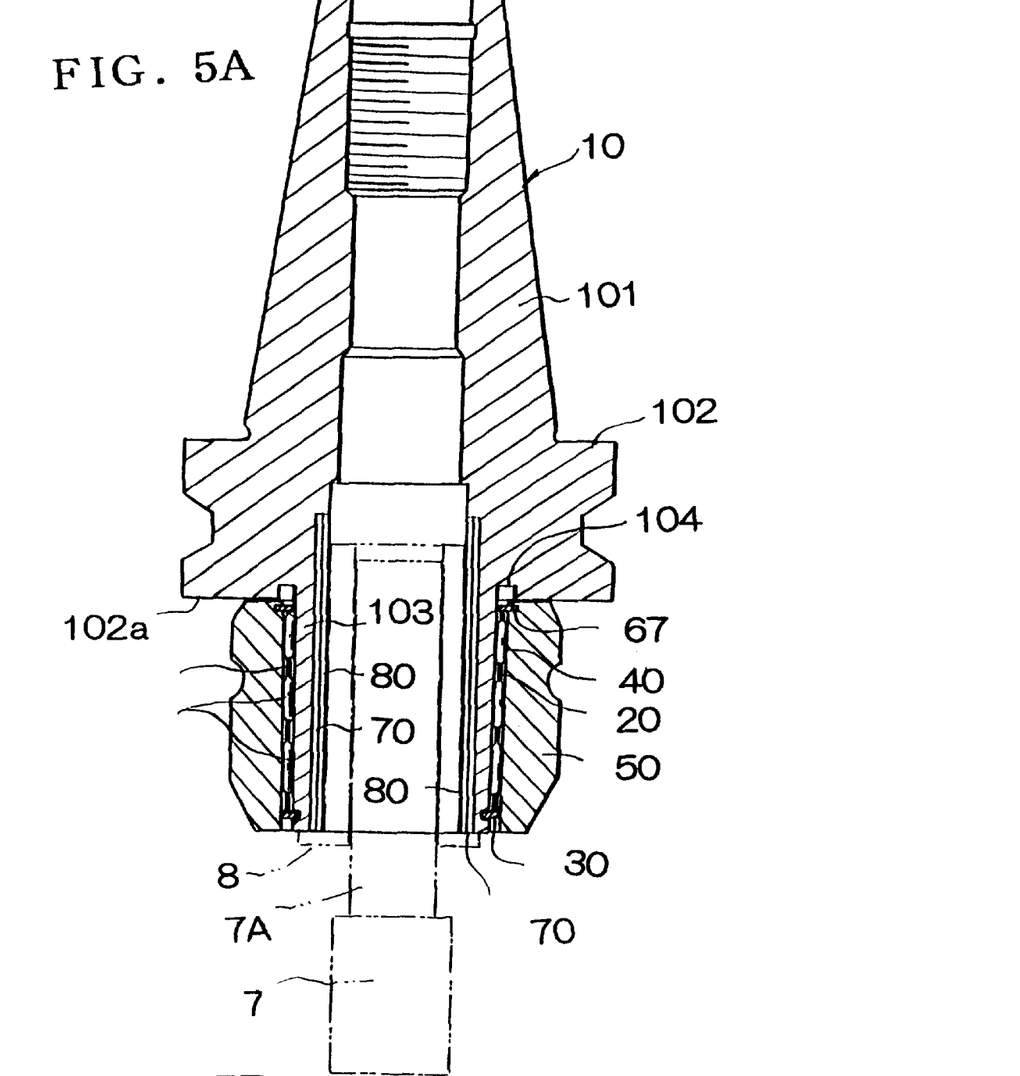
FIG. 5A is a cross-sectional view of a chuck.
Figure 5B:
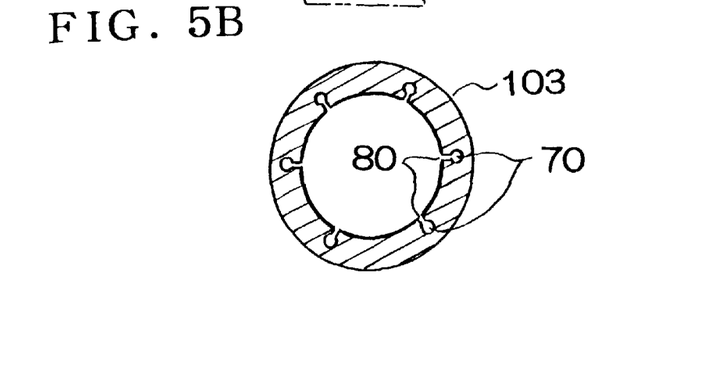
FIG. 5B is a transversal cross section of the chuck sleeve.

Next, a fourth embodiment of the present invention will be described with reference to FIGS. 5A and 5B. In FIGS. 5A and 5B, the structural components identical to those shown in FIG. 1 are denoted by the same reference numerals, and descriptions therefor will be omitted. The portion different from the structure shown in FIG. 1 will be mainly described.

In the fourth embodiment, in addition to a ring-shaped groove 104 that is formed in the flange 102 in order to increase the effective length of the chuck sleeve 103, a plurality of holes 70 are formed in the chuck sleeve 103 at predetermined intervals in the circumferential direction such that the holes 70 extend over substantially the entire length of the chuck sleeve 103 and parallel to the center axis thereof. Further, a plurality of slits 80 are formed in the chuck sleeve 103 at circumferential locations corresponding to those of the holes 70 such that the slits 80 extend from the holes 70 and open at the inner wall surface.

In the chuck according to the fourth embodiment, since the plurality of holes 70 are formed in the chuck sleeve 103 and the slits 80 are formed such that the slits 80 extend from the holes 70 to communicate with the inner space of the chuck sleeve 103, the chuck sleeve 103 can more easily undergo elastic deformation in the direction of decreasing diameter. Thus, the reduction in the internal diameter increases further in the area corresponding to the points P2 to P11 shown in FIG. 2C and the reduction in that area can be made more uniform compared to the case of the conventional chuck shown by the curve 61 in FIG. 2A.

Accordingly, over substantially the entire length of the chuck sleeve, the chuck sleeve 103 can be elastically deformed in the direction of decreasing the diameter with relatively small tightening force. Further, the effective chucking length of the chuck sleeve 103 can be increased with no accompanying increase in the length thereof, and the wall thickness of the clamp sleeve 50 can be decreased. Further, when a tool inserted into the chuck sleeve 103 is tightened, oil adhering to the tool can flow into the slits 80 formed in the chuck sleeve 103.

Figures 6A, 6B:
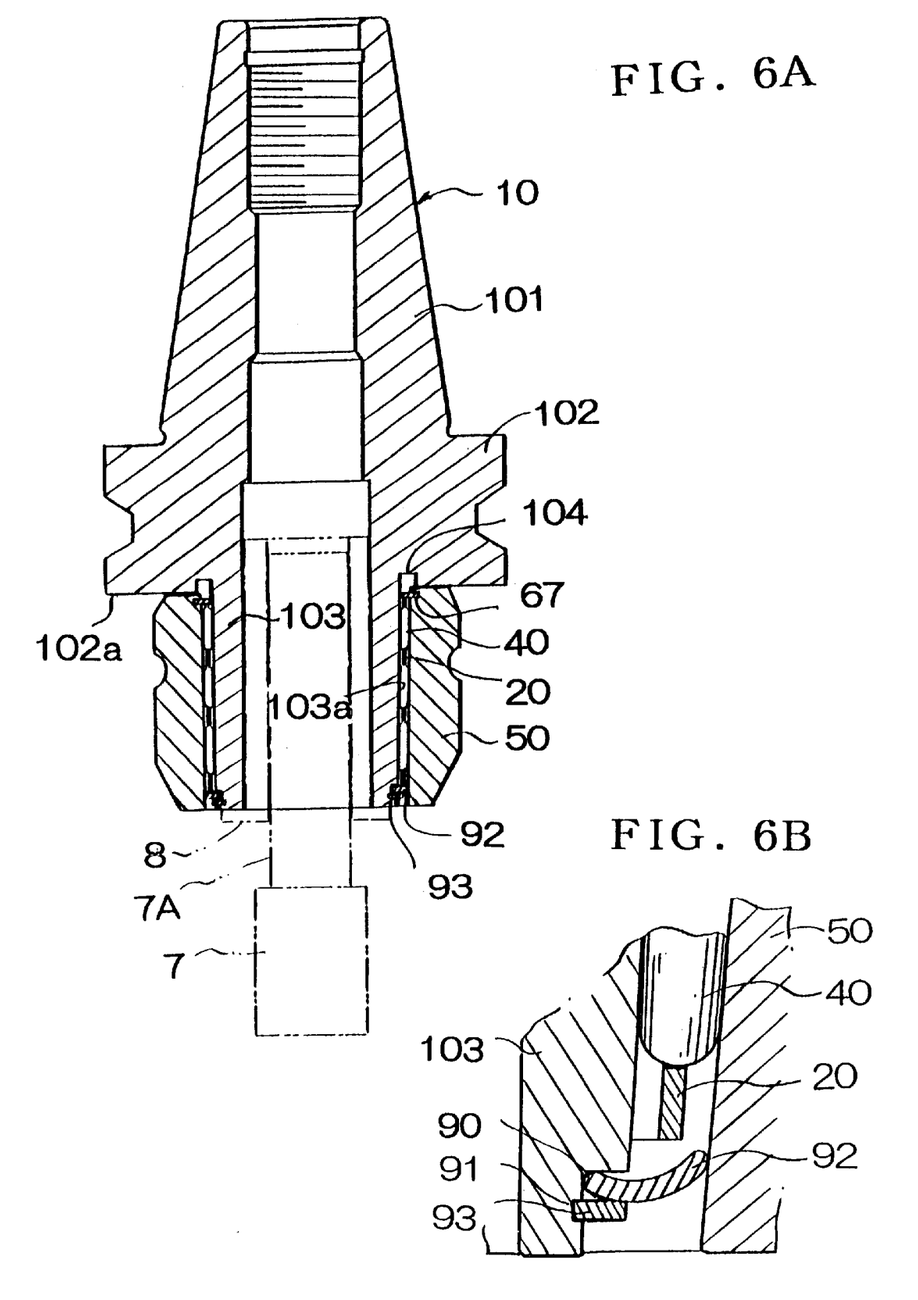
FIG. 6A is a cross-sectional view of a chuck.
FIG. 6B is an enlarged sectional view of a main portion of the chuck sleeve.

Next, a fifth embodiment of the present invention will be described with reference to FIGS. 6A and 6B. In FIGS. 6A and 6B, the structural components identical to those shown in FIG. 1 are denoted by the same reference numerals, and descriptions therefor will be omitted. The portion different from the structure shown in FIG. 1 will be mainly described.

In the fifth embodiment, in addition to a ring-shaped groove 104 that is formed in the flange 102 in order to increase the effective length of the chuck sleeve 103, an annular side plate 92 is provided in order to apply large chucking force to the tool shank even at the tip end of the chuck sleeve 103. That is, an annular stepped portion 90 formed in the outer periphery of the tip end of the chuck sleeve 103 such that the stepped portion 90 has no wall on the tip end side, and an annular groove 91 is formed adjacent to the stepped portion 90. The annular side plate 92 made of metal having elasticity is fitted into the stepped portion 90 to engage therewith, and a stopper ring 93 is fitted into the annular groove 91 in order to hold the annular side plate 92 and prevents it from coming off the chuck sleeve 103. The outer peripheral edge of the annular side plate 92 is in engagement with the inner circumferential surface of the clamp sleeve 50.

In the chuck of the fifth embodiment having the above-described structure, when a tool 7 is to be chucked, the shank 7A of the tool 7 is inserted into the cylindrical bore of the chuck sleeve 103. When the clamp sleeve 50 is rotated clockwise, each needle roller 40 in contact with the tapered inner surface of the clamp sleeve 50 revolves spirally along the outer surface of the chuck sleeve 103 while rotating about its own axis. Thus, the roller retaining sleeve 20 moves toward the flange 102, while rotating, in accordance with the revolution of the needle rollers 40, and at the same time the clamp sleeve 50 also moves toward the flange 102. Thus, the clamp sleeve 50 strongly presses inward the chuck sleeve 103 from the outer circumference thereof via the needle rollers 40 in order to reduce the diameter of the chuck sleeve 103, thereby chucking the shank 7A of the tool 7.

Meanwhile, since the outer peripheral edge of the annular side plate 92 is in engagement with the tapered inner circumferential surface of the clamp sleeve 50 at its tip end side, the annular side plate 92 is pressed against the chuck sleeve 103 in order to reduce the diameter of the chuck sleeve 103. Thus, strong chucking force can be applied to the tool shank even at the tip end of the chuck sleeve 103.

Accordingly, in the fifth embodiment of the present invention, strong chucking force can be applied to the shank of a tool within an area extending from the base end to the tip end of the chuck sleeve 103, so that the tool can be chucked more reliably.

Figure 7:
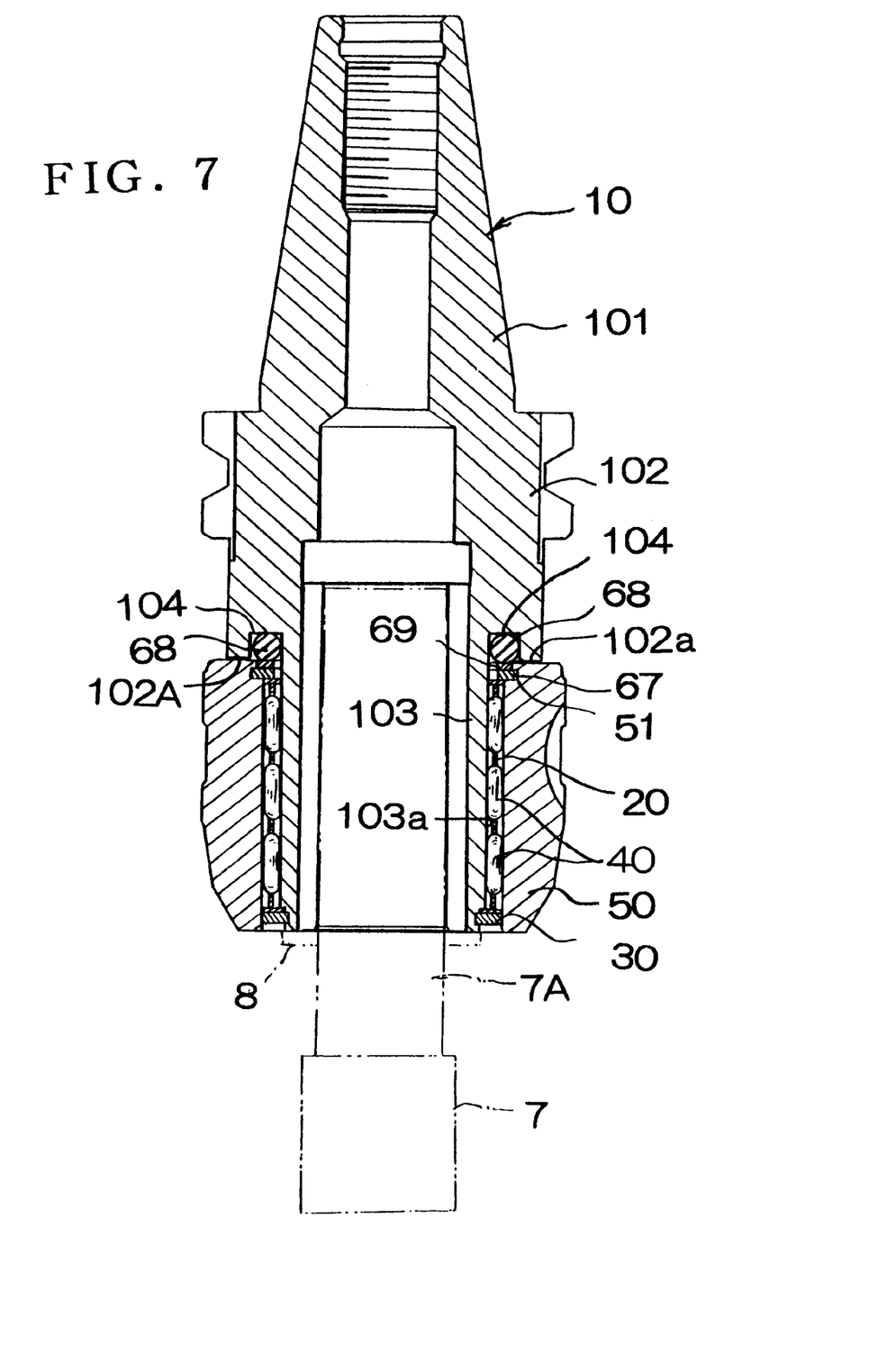
FIG. 7 is a cross-sectional view of a chuck showing a sixth embodiment of the present invention.

Next, a sixth embodiment of the present invention will be described with reference to FIG. 7. In FIG. 7, the structural components identical to those shown in FIG. 1 are denoted by the same reference numerals, and descriptions therefor will be omitted. The portion different from the structure shown in FIG. 1 will be mainly described.

In the sixth embodiment, the outer peripheral edge of a retainer ring 67 is fitted into an annular groove 51 formed in the inner circumferential wall of the based end portion of the clamp sleeve 50 facing the flange 102, and the inner peripheral edge of the retainer ring 67 is extended inward to contact with or is located proximity to the outer circumference of the chuck sleeve 103. The flange-side end of the roller retaining sleeve 20 abuts the retainer ring 67. The retainer ring 67 is made of elastic metal such as stainless steel and is in the form of a C-shaped snap ring that has a cut-away portion.

An O-ring 68 formed of synthetic resin or synthetic rubber, which is elastically deformable, is fitted into a groove formed in the end surface of the flange 102 opposite the shank portion. An annular spacer 69 is fitted onto the chuck sleeve 103 to be interposed between the O-ring 68 and the retainer ring 67, so that the O-ring 68 is supported between the bottom of the groove 104 and the spacer 69, and the spacer 69 is in contact with the retainer ring 67. The O-ring 68 is formed of synthetic resin such as fluoro resin or synthetic rubber, while the spacer is an annular metal plate formed of stainless steel or the like.

In the chuck of the sixth embodiment having the above-described structure, when a tool 7 is to be chucked, the shank 7A of the tool 7 is inserted into the cylindrical bore of the chuck sleeve 103. When the clamp sleeve 50 is rotated clockwise, each needle roller 40 revolves spirally along the outer surface of the chuck sleeve 103 while rotating about its own axis. Thus, the roller retaining sleeve 20 moves toward the flange 102, and at the same time the clamp sleeve 50 also moves toward the flange 102. Thus, the clamp sleeve 50 strongly presses inward the chuck sleeve 103 from the outer circumference thereof via the needle rollers 40 in order to reduce the diameter of the chuck sleeve 103, thereby chucking the shank 7A of the tool 7. At this time, due to the movement of the clamp sleeve 50 toward the flange 102, the retainer ring 67 also moves in the same direction, so that the retainer ring 67 compresses and deforms the O-ring 68 via the spacer 69. As a result, the O-ring 68 is pressed against the bottom of the groove 104 and against the retainer ring 67.

In the chuck according to the sixth embodiment, the O-ring 68 absorbs vibrations, such as chatter, which would otherwise be generated when cutting operation is performed through use of the tool 7 chucked by the chuck. Therefore, the cutting operation can be performed accurately. Further, dust and cutting fluid used for cutting operation are reliably prevented from entering the needle-roller 40 section through the clearance between the flange 102 and the clamp sleeve 50. Further, dust and cutting fluid used for cutting operation are reliably prevented from entering the groove 104 formed in the flange 102.

In order to simply the structure, the sixth embodiment may be modified such a way that the spacer 69 is omitted, and the O-ring 68 fitted into the groove 104 is pressed directly against the retainer ring 67.

In the chuck of the sixth embodiment, the flange is formed by a portion between the taper shank portion 101 of the holder body 10 and the base end of the chuck sleeve 103, or the surface with which the end surface of the clamp sleeve 50 is brought into contact.

The characteristic feature of the fifth embodiment is preferably incorporated into the chuck according to the sixth embodiment, whether or not the spacer 69 is used.

In the above-described embodiments, a description is given of the case where the shank 7A of a tool 7 is inserted into and chucked by the chuck sleeve 103 via the spring collet 8. However, the present invention is not limited thereto, and is applicable to the case where the shank 7A of a tool 7 is directly inserted into and chucked by the chuck sleeve 103 without use of the spring collet 8.

Also, the present invention can be applied to holder body having a straight shank, as well as holder body having a tapered shank.

Obviously, numerous modifications and variations of the present invention are possible in light of the above teachings. It is therefore to be understood that within the scope of the appended claims, the present invention may be practiced otherwise than as specifically described herein.

What is claimed is:

1. A chuck comprising:
   a holder body having a shank portion for insertion into a spindle of a machine tool, a gripping flange formed at one end of said shank portion, and a chuck sleeve that extends from said flange in a direction away from said shank portion in alignment with an axis of said shank portion, said chuck sleeve having a tapered outer circumferential surface whose diameter decreases from a base end adjacent said flange a tip end of said chuck sleeve;

a clamp sleeve fitted onto the outer circumference of said chuck sleeve such that said clamp sleeve is rotatable and axially movable relative to said chuck sleeve, said clamp sleeve having a tapered inner circumferential surface whose diameter decreases from the base and adjacent to said flange toward the tip end of said clamp sleeve; and needle rollers disposed between the outer circumferential surface of said chuck sleeve and the inner circumferential surface of said clamp sleeve over the entire circumference, said needle rollers inclining in the circumferential direction at a predetermined angle with respect to the center axes of said chuck sleeve and said clamp sleeve, and said clamp sleeve being rotated to cause said needle rollers to revolve spirally along the outer circumferential surface of said chuck sleeve while rotating about their own axes in order to decrease and restore the diameter of said chuck sleeve, wherein a groove having a predetermined depth and a ring-like shape is formed in the end surface of said flange opposite said shank portion such that said groove extends along the outer circumference of the base end of said chuck sleeve through which said chuck sleeve is joined with said flange.

2. A chuck according to claim 1, wherein a plurality of grooves are formed in the inner wall surface of said chuck sleeve at predetermined intervals in the circumferential direction such that said grooves extend over the entire length of the inner wall surface and parallel to the center axis of said chuck sleeve.

3. A chuck according to claim 1, wherein a plurality of holes are formed in said chuck sleeve at predetermined intervals in the circumferential direction such that said holes extend over substantially the entire length of said sleeve and parallel to the center axis thereof.

4. A chuck according to claim 1, wherein a plurality of holes are formed in said chuck sleeve at predetermined intervals in the circumferential direction such that said holes extend over substantially the entire length of said sleeve and parallel to the center axis thereof; and a plurality of slits are formed in said chuck sleeve at circumferential locations corresponding to those of said holes such that said slits extend from said holes and open at the inner wall surface of said chuck sleeve.

5. A chuck comprising:

a holder body having a shank portion for insertion into a spindle of a machine tool, a gripping flange formed at one end of said shank portion, and a chuck sleeve that extends from said flange in a direction away from said shank portion in alignment with an axis of said shank portion, said chuck sleeve having a tapered outer circumferential surface whose diameter decreases from a base end adjacent said flange to a tip end of said chuck sleeve:

a clamp sleeve fitted onto the outer circumference of said chuck sleeve such that said clamp sleeve is rotatable and axially movable relative to said chuck sleeve, said clamp sleeve having a tapered inner circumferential surface whose diameter decreases from the base and adjacent to said flange toward the tip end of said clamp sleeve; and needle rollers disposed between the outer circumferential surface of said chuck sleeve and the inner circumferential surface of said clamp sleeve over the entire circumference, said needle rollers inclining in the circumferential direction at a predetermined angle with respect to the center axes of said chuck sleeve and said clamp sleeve, and said clamp sleeve being rotated to cause said needle rollers to revolve spirally along the outer circumferential surface of said chuck sleeve while rotating about their own axes in order to decrease and restore the diameter of said chuck sleeve, wherein a groove having a predetermined depth is formed in the end surface of said flange opposite said shank portion such that said groove extends along the outer circumference of the base end of said chuck sleeve through which said chuck sleeve is joined with said flange, and an annular plate made of metal having elasticity is provided at the tip end portion of said chuck sleeve in such a manner that an inner circumferential portion of said plate is held at the outer circumferential surface of the tip end portion of said chuck sleeve, while the outer circumferential edge of the plate is pressed against the inner circumferential surface of the clamp sleeve.

6. A chuck according to claim 5, wherein said groove having a predetermined depth is formed along the entire outer circumference of said chuck sleeve to have a ring-like shape.

7. A chuck according to claim 1, wherein an elastically deformable O-ring is fitted into the groove formed in the end surface of said flange opposite said shank portion; and a retainer ring made of an elastic metal is provided at the flange-side end portion of said clamp sleeve in such a manner that the outer circumferential edge of said retainer ring is fixed to the inner circumferential portion of the flange-side end portion of said clamp sleeve, while the flange-side end of a roller retaining sleeve that retains said needle rollers is supported by the inner circumferential portion of said retainer ring, wherein when said O-ring is compressed through rotation of said clamp sleeve, said O-ring is pressed against the bottom of said groove and said retainer ring.

8. A chuck according to claim 7, wherein an annular metal spacer is fitted onto said chuck sleeve such that said spacer is interposed between said O-ring and said retainer ring, wherein when said O-ring is compressed through rotation of said clamp sleeve, said O-ring is pressed against the bottom of said groove and is also pressed against said retainer ring via said spacer.

9. A chuck according to claim 1, wherein an annular plate made of metal having elasticity is provided at the tip end portion of said chuck sleeve in such a manner that an inner circumferential portion of said plate is fixed to the outer circumferential surface of the tip end portion of said chuck sleeve, while the outer circumferential edge of the plate is pressed against the inner circumferential surface of the clamp sleeve.

10. A chuck comprising:

a body having a shank portion, a flange formed at one end of said shank portion, and a chuck sleeve that extends from said flange in a direction away from said shank portion, said chuck sleeve having a tapered outer circumferential surface whose diameter decreases from a base end adjacent to said flange toward the tip end of said chuck sleeve, said flange having a ring shaped groove therein immediately adjacent said chuck sleeve, the ring-shaped groove having a circumferentially arranged inner cylindrical surface which joins with the outer circumferential surface of the chuck sleeve immediately adjacent said ring-shaped groove; and a clamp sleeve fitted onto the outer circumference of said chuck sleeve such that said clamp sleeve is rotatable and axially movable relative to said chuck sleeve, said clamp sleeve having a tapered inner circumferential surface whose diameter decreases from the base and adjacent to said flange toward the tip end of said clamp sleeve.

11. The chuck of claim 10 further including needle rollers disposed between the outer circumferential surface of said chuck sleeve and the inner circumferential surface of said clamp sleeve over the entire circumference, said needle rollers inclining in the circumferential direction at a predetermined angle with respect to the center axes of said chuck sleeve and said clamp sleeve, and said clamp sleeve being rotated to cause said needle rollers to revolve spirally along the outer circumferential surface of said chuck sleeve while rotating about their own axes in order to decrease and restore the diameter of said chuck sleeve.

* * * * *